(12) United States Patent
Wagenblatt (10) Patent No.: US 8,543,568 B2
(45) Date of Patent: Sep. 24, 2013

(54) DATA ENTRY MANAGEMENT

(75) Inventor: Timo Wagenblatt, Wallostraβe (DE)

(73) Assignee: SAP AG, Walldorf (DE)

(*) Notice: Subject to any disclaimer, the term of this patent is extended or adjusted under 35 U.S.C. 154(b) by 199 days.

(21) Appl. No.: 12/837,925

(22) Filed: Jul. 16, 2010

(65) Prior Publication Data
US 2012/0016868 A1    Jan. 19, 2012

(51) Int. Cl.
*G06F 7/00*    (2006.01)

(52) U.S. Cl.
USPC .......................................................... 707/722

(58) Field of Classification Search
USPC .................... 707/733, 734, 784, 722
See application file for complete search history.

(56) References Cited

U.S. PATENT DOCUMENTS

| | | | |
|---|---|---|---|
| 2004/0054569 A1* | 3/2004 | Pombo et al. ..................... | 705/7 |
| 2006/0111953 A1* | 5/2006 | Setya ............................... | 705/8 |
| 2006/0168259 A1* | 7/2006 | Spilotro et al. ................. | 709/229 |
| 2007/0079247 A1* | 4/2007 | Carignan et al. ............... | 715/745 |
| 2008/0263436 A1* | 10/2008 | Ahrens et al. .................. | 715/234 |
| 2009/0216569 A1* | 8/2009 | Bonev et al. ..................... | 705/5 |

OTHER PUBLICATIONS

Dropdown List Box, Oct. 22, 2002, http://web.archive.org/web/20021022171933/http://www.sapdesignguild.org/resources/htmlb_guidance/dropdown.html.*
Fathumb: A Facet-based interface for mobile search, Amy K. Karlson, 2006 ACM 1-59593-178-3/06/0004.*

* cited by examiner

*Primary Examiner* — Kimberly Wilson
*Assistant Examiner* — Hau H Hoang (57) ABSTRACT

A data entry management system includes computer executable instructions tangibly embodied on non-transitory media. The data entry management system includes a processing logic which may control a display area. The processing logic may determine a display area content. The display area content may include one of a working context search screen, a search screen, a data entry help screen, and a single-dimensional selector screen. The processing logic may determine which of the working context search screen, the search screen, the data entry help screen, and the single-dimensional selector screen to display in display area based on a profile.

20 Claims, 8 Drawing Sheets

DATA ENTRY MANAGEMENT

BACKGROUND

The present disclosure relates generally to a data entry management system. More specifically, the disclosure relates to innovative ways of configuring context sensitive data. Data entry is a time consuming activity. For example, an account manager may waste time trying to figure out what data is important for a specific task. A system which utilizes various controls and contextual support could determine this data for the account manager. Therefore, there is a need for a system which utilizes controls and contextual smart support.

SUMMARY

One embodiment of the disclosure relates to a data entry management system which includes computer executable instructions tangibly embodied on non-transitory media. The data entry management system includes a processing logic which may control a display area. The processing logic may determine a display area content. The display area content may include one of a working context search screen, a search screen, a data entry help screen, and a multi-dimensional selector screen. The processing logic may determine which of the working context search screen, the search screen, the data entry help screen, and the multi-dimensional selector screen to display in display area based on a profile.

Another embodiment of the disclosure relates to a method that includes receiving data from at least one of a control route module, a profile management module, a working context module, a business rules module, and an authorization module. The method further includes determining a profile based on the received data. The method also includes determining a content of a display area based on the profile and displaying the content in the display area. The content includes one of a working context search screen, a search screen, a data entry help screen, and a multi-dimensional selector screen.

One embodiment of the disclosure relates to a data entry management system. The data entry management system includes a processing logic which may control a display area. The processing logic may determine a display area content. The display area content includes one of a working context search screen, a search screen, a data entry help screen, and a multi-dimensional selector screen. The data entry management system includes a database coupled to the processing logic. The data entry management system includes a memory coupled to the processing logic. The data entry management system includes a control route engine coupled to the processing logic. The data entry management system includes a profile management engine coupled to the processing logic. The data entry management system includes a working context engine coupled to the processing logic. The data entry management system includes a business rules engine coupled to the processing logic. The data entry management system includes an authorization engine coupled to the processing logic. The data entry management system includes a help engine coupled to the processing logic. The processing logic may determine a configuration of the display area based on a profile.

DETAILED DESCRIPTION OF THE EXEMPLARY EMBODIMENTS

Figure 1:
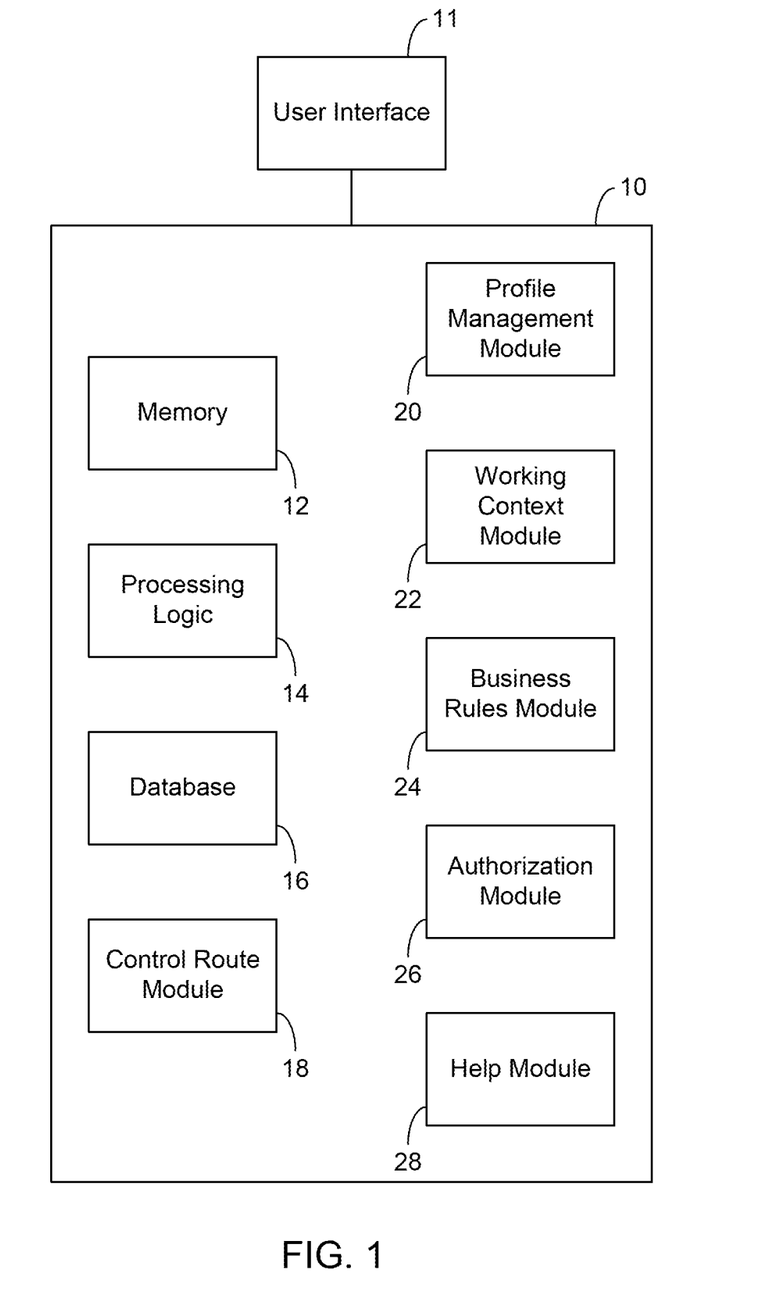
FIG. 1 is a block diagram, according to one exemplary embodiment.

Referring to FIG. 1, a block diagram of a data entry management system 10 is shown, according to an exemplary embodiment. Data entry management system 10 may include a memory 12, a processing logic 14, a database 16, a control route module 18, a profile management module 20, a working context module 22, a business rules module 24, an authorization module 26, a help module 28, and other modules, according to exemplary embodiments. Data entry management system 10 may communicate with a user interface 11. User interface 11 may include various display areas. User interface 11 may be utilized by a user to interact with data entry management system 10.

Control route module 18 may control the display area (e.g., number of entries, order of data, data itself, data size, data font, data color, data identifiers, data language, data currency, etc.). Display area may include a search area dependent on a profile, a search area independent of a profile, a filtered data area, and/or a data selection area. Control route module 18 may control whether there is one or multiple data entry options. Control route module 18 may control the use of the last entered feature option. For example, control route module 18 may turn on or turn off the last entered feature option. In an exemplary embodiment, when the last entered feature is turned on the last entered data will appear in the data area. If the last entered feature is turned off, then the last entered data will not appear in the data area. Control route module 18 may control whether the working context option is employed. Working context option may utilize data relating to what is presently being worked on, the areas the user is assigned to, the authorization level of the user, a location of the user, historical data, historical data related to the user, historical data related to the client, etc. Control route module 18 may control the display area based on data (e.g., user profile data) received from profile management module 20. In another exemplary embodiment, control route module 18 may control the display area based on data received from profile management module 20, scheduling data, location data, timing data, or any combination of data disclosed herein. In an exemplary embodiment, the content in the display area may depend on a profile of the user, the data that the user entered last, an application profile, or any combination thereof.

A profile may be a user profile, an application profile, or history profile. A user profile is defined as characteristics of the user that are assigned to the user based on the user's role(s) in the business. For example, a key account manager may have certain assigned characteristics based on their role as a key account manager. Additionally, the user profile may be characteristics of the user that do not require input from the user, are not done at the direction of the user, and/or are not under the control of the user. An application profile is defined as the characteristics of the application. A history profile is defined as the characteristics of a historic usage pattern Profile management module 20 may manage various user profiles. For example, a Key Account Manager for five clients may have a user profile that is matched to these five clients. In another example, a Key Account Manager for certain products (e.g., ice creams) may have a user profile that is matched to all of these products (e.g., all of the ice cream products) available in database 16. Further, a call center representative may have a user profile that allows the call center representative to have access to all of the data in database 16. A user profile may be accessed via a pull-down field which may include one, a few, many, or a plurality of user profiles. A user profile may be based on position data (e.g., Key Account Manager), supervisor data (e.g., Joe Black is the Key Account Manager's boss), subordinate data (e.g., Jill Jones reports to Key Account Manager), client data (e.g., Store Chain One, Store Chain Two, Store Chain Three, and Store Chain Four are clients of Key Account Manager), product data (e.g., Star Ice Creams, Star Chocolates, Star Bread, Star Butter, Star Milk, and Star Gum are products assigned to Key Account Manager), budget authority data (e.g., Key Account Manager may approve budget requests up to $100,000), and any other type of user specific data.

Working context module 22 may provide data relating to matters an individual is working on. In an exemplary embodiment, processing logic 14 may utilize working context module 22 to determine which attributes should be accessed from database 16. For example, working context module 22 may determine that the working context is chocolate ice creams for all of client's stores during the last thirty days. Processing logic 14 may utilize these working context attributes and request access to database 16 to present a filtered view of the database that includes only the data associated with these attributes. The filtered view may be stored in memory 12 or a secondary database. In exemplary embodiments, when processing logic 14 utilizes these working attributes to access database 16, the result may be filtered data or the creation of a secondary database. Processing logic 14 and memory 12 may be integrated into any one of these modules. In an exemplary embodiment, processing logic 14 and memory 12 may be a separate system. In an exemplary embodiment, working context may be based on the combination of static working context and the dynamic working context.

In an exemplary embodiment, an attribute may be in a default configuration and may be utilized within the database as a working context attribute (e.g., priority, status, etc.). In addition, multiple values may be utilized for a working context. For example, a number of products (e.g., five, ten, twenty, etc.) may be a working context for an individual (e.g., Marketing Manager, Sales Representative, Service Representative, etc.). In an exemplary embodiment, the products may be prioritized (e.g., from 1 to n).

In an exemplary embodiment, a Key Account Manager may be responsible for the execution of given marketing initiatives for accounts. The Key Account Manager may develop promotional plans, monitor sales, and monitor and adjust promotional plans. In an exemplary embodiment, a Brand Manager may be responsible for the management of a specific brand to meet targets/objectives. In an exemplary embodiment, a Finance (Funds) Manager may provide budgets and financial measures for the execution of trade promotions. Finance Manager may track overall spending to avoid financial gaps and manage budget re-allocations. In an exemplary embodiment, a Trade Marketing Manager may be responsible for marketing strategies directed at customer channels, wholesalers, distributors, and/or retailers. In an exemplary embodiment, an Area (Territory) Manager may manage and monitor day-to-day sales and service operations for assigned territories to achieve their sales, delivery, and/or merchandising goals. A Sales Director and VP of Sales may be responsible to develop and apply the sales strategy and objectives. Sales Director and VP of Sales may monitor sales plans, sales pipeline and determine the reasons and remedies for attainment/under achievement of goals. In an exemplary embodiment, a Marketing Director and VP of Marketing may be responsible for overall corporate positioning as well as trade and brand marketing initiatives.

Data entry management system 10 may be utilized by these individuals. For example, a Key Account Manager ("KAM") for Store Chain One may focus only on the frozen food category at Store Chain One. So in the majority of cases, the KAM may only select a Store Chain One account and products and categories within the frozen food space. The KAM may want to create a new trade promotion. In an exemplary embodiment, data entry management system 10 may display a drop-down list box that contains the last 5 accounts selected plus the ones (e.g., Store Chain One—frozen food space) that the KAM is directly responsible for. The drop-down list box may be used to navigate to an advanced search in case the KAM plans a trade promotion for another account.

A Trade Promotion Management professional may be an internal user who works with the complete Trade Promotion Management solution. In an exemplary embodiment, the working context may be enabled in the non-strict mode for this user role. A Trade Finance professional may be an internal user who works with the financial side of the Trade Promotion Management solution. In an exemplary embodiment, the working context may be enabled in the non-strict mode for this user role. A Trade Claims professional may be an internal user who works with the claims management part of the Trade Promotion Management solution. In an exemplary embodiment, the working context may be enabled in the non-strict mode for this user role. In exemplary embodiments, working context functionality may be utilized in two different modes (e.g., strict and/or non-strict/open).

Business rules module 24 may provide data related to various business rules. For example, a business rule may govern an employee's responsibilities, such as, supervisor authority, point of contact for a client, point of contact for the media, budgeting authority, payment authority, and approval of business plans, budgets, promotions. Business rules may also be related to current budgets (e.g., markdown budgets) versus actual cost and providing authorization for any overruns.

Authorization module 26 may provide data related to authorization levels of users. For example, territory managers would have different authority levels than a key account manager or a global manager. In an exemplary embodiment, the authorization level may determine the data entry options for a user.

Help module 28 may provide data related to a help function. Help module may be supported by the CRM WebClient UI Guidelines. Help module 28 may be associated with editable fields. In an exemplary embodiment, to open a search help from help module 28, the user can either click the Search Help icon ( ) or enter something in a field that is equipped with the Search Help function and press ENTER. After pressing ENTER, the following cases may be considered.

First, no matching value for the entered value exists. In this case the system may set all entered letters to capital letters and automatically add in the field behind the manually entered value the text '(does not exist)'. In addition, the system may launch an error message in the application log.

Second, exactly one matching value for the entered value exists: The complete value may be inserted. The search help dialog may not be started.

Third, more than one matching value for the entered value exists. After hitting ENTER, the information entered manually by the user may be used to open the search help dialog box and directly offer the result list of all entries that match the information that was entered. The search area may be closed automatically when the value help is opened. In this case, if the user opens the search area manually, then the search fields show the defaults and the value fields are blank.

For fields supporting the manual entry of more than one value type (such as business partner fields that allow entry of ID or name), this behavior may work for both types of manual entries. In general, search terms without appended wildcards may be treated as terms with wildcards. Terms without wildcards may also expanded automatically. For example, the term "Mi" in a search field may be treated like "Mi*". The user may enter data that is not unique in a field and presses ENTER. No automatic confirmation of the first value may be found, but an error message appears to inform the user that the entry is not unique. The text in the field remains as it was entered by the user.

Default search fields in search help dialog box windows may either be the same as or different from default fields in the corresponding advanced search. Saved searches may or may not be available for search help dialog boxes. When the user makes a selection and leaves the dialog box, the dialog box may launch again with blank search fields and an empty result list, but the attributes and operators that were adjusted previously may remain unchanged. Search fields in a search help dialog box may have the following types: (1) Plain input fields—input fields equipped with access to a value help or a date picker; and (2) Dropdown boxes—input fields equipped with access to a search help dialog box may be provided, but search helps called from within the search help must not provide access to further search helps (to avoid excessive stacking of dialog box windows).

The smart value help may be available for fields that are either equipped with a search help or a regular simple value help (for example, country or language fields). The smart value help may be a menu that is automatically opened below an associated field. As a default, the smart value help may offer the last 5 entries that have been entered by the user. In an exemplary embodiment, smart value help may show the last 5 entries in a search form which allows the user to utilize the smart value help function.

Figure 2:
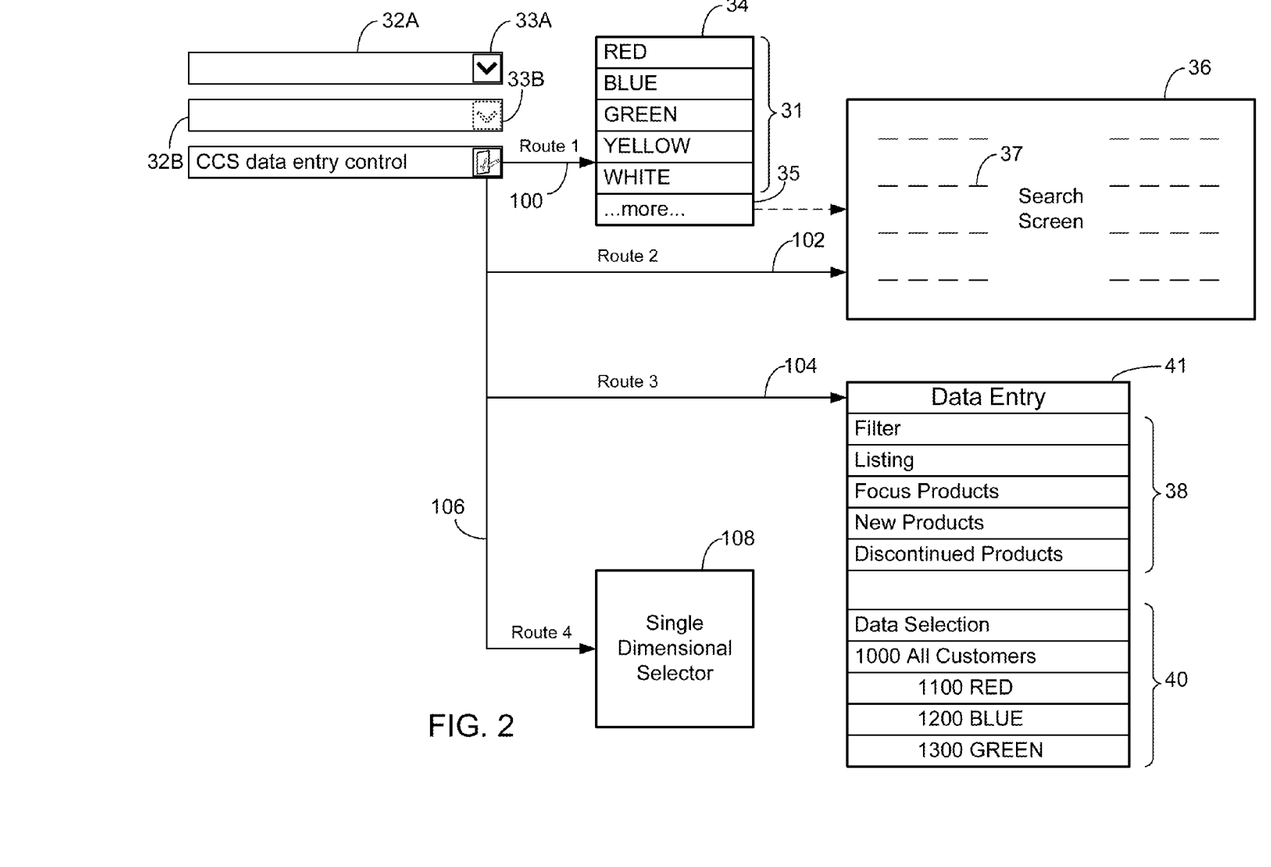
FIG. 2 is an illustration of a context data entry system, according to one exemplary embodiment.

In FIG. 2, an illustration of a context data entry system is shown, according to one exemplary embodiment. Data entry management system 10 may include a configurable and context sensitive data entry control field 32A with a pull-down button 33A. In an exemplary embodiment, pull-down button 33A may be a bold check symbol. In another exemplary embodiment, pull-down button 33B may be a semi-transparent check symbol. In exemplary embodiments, pull-down button 33A, 33B may lead to a drop-down menu, working context search screen 34, search screen 36, single-dimensional selector, multi-dimensional selector, or any combination thereof. Data entry management system 10 may be designed to have a logic function which allows for a first route 100, a second route 102, a third route 104, and a fourth route 106. Additional, fewer, or different routes may also be provided. First route 100 generates a working context search 34 based on a user profile or an application profile. Working context search 34 includes working context data fields 31 and a button 35. Button 35 may allow for the selection of further data fields. Button 35 may allow the user to navigate to a search screen and/or field. Button 35 may be utilized to select additional allowed data. Working context search 34 may be based on the use of a last entered feature option. For example, the last number of predefined entries (e.g., one, five, ten, hundred, etc.). Working context search 34 may be based on a working context (e.g., KAM, VP of Sales, etc.). In an exemplary embodiment, customers that a KAM is responsible for may be listed in working context data fields 31 while button 35 may be utilized to select peer data (e.g., reference data). In another exemplary embodiment, a master data administrator may be responsible for all of the customers and only have a predefined number (e.g., one, five, ten, etc.) located in working context data fields 31 while utilizing button 35 for advanced searches. In an exemplary embodiment, a user may enter data and data entry management system 10 may determine whether the entered data is a valid option based on the control of the displayed data option.

In an exemplary embodiment, data entry management system 10 may have a path from button 35 to search screen 36, multiple-dimensional selector 41, single-dimensional selector, or any combination thereof.

A user profile may include a user's business contacts, a user's responsibilities (e.g., clients, managed employees, etc.), a user's budget authority, and/or a user's approval level (e.g., business plans, budget clearance, payment authority, etc.). An application profile may be the modules and/or rules utilized in a customer resource management system. Application profile may be based on the application being used. For example, different profiles may exist when utilizing the customer resource management system versus another application (e.g., business plan generator). In an exemplary embodiment, route two 102 generates a search screen 36 based on the unavailability of a user profile, business contact rules, and/or an application profile. In other words, in the case that the user profile, business contact rules, and/or application profiles are not available, the system may generate search screen 36. In an exemplary embodiment, route three 104 generates a multi-dimensional selector based on the unavailability of a user profile, business contact rules, an application profile, and/or too may data options being generated. In an exemplary embodiment, route four 106 generates a single-dimensional selector screen 108 for clients with a profile indicating that a single-dimensional selector screen will be utilized during a migration stage. In various embodiments, single-dimensional selector screen 108 may include a drop-down menu(s), radio-buttons, and/or any combination thereof.

In exemplary embodiments, search screens may allow the user to select entries from a database or by typing in data obtain proposals. For example, the user might type in "alfa" and the database may return "Alpha International" and/or "Alpha National" which the user can then select from.

In an exemplary embodiment, the last entry feature option may be combined with the control of the display data. The last entry feature option may be placed at the bottom or the top of the displayed list.

Data entry management system 10 may allow for configurable context sensitive data entry to be available and/or replace all drop-down list boxes and entry fields with search helps (simple and advanced). Data entry management system 10 may adapt the data entry function to the user's needs. This may eliminate the need to request a search help to enter the same data over and over again and eliminate having different concepts, labels, and/or definitions for the same attribute (e.g., customers, products, product logistics, inventory, product characteristics, etc.) in different applications a user is working on. For example, in a customer resources management system a first product characteristic may be labeled first characteristic first product whereas in another system the same first product characteristic may be labeled first product first characteristic. Therefore, data entry management system 10 may generate the route which applies best to the application and data entry considering the context the user is working in (e.g., which application, customers, etc.). The configuration of a control may depend on the case (context) the control is using: For example, a Sales Representative may visit hundreds of customers, the last x customers may not be of interest, and the customers the Sales Representative is responsible for may not fit in one drop-down list box. Therefore, one option may be a view of a BAdi to display the 20 customers from this week's travel schedule and to utilize button 35 to access the other customers the Sales Representative is responsible for. BAdi is a business add-ins which are the basis for enhancements in programs. The BAdi may be object plug-ins and can be called by the programs. The calling program controls which BAdi implementations are used by specifying filter values. A BAdi may include a BAdi interface, a set of filters, and/or program settings. The BAdi may be implemented to control what is shown in the data entry field and/or data entry display based on the project specific business rules that may vary from customer to customer.

In an exemplary embodiment, if there is an active working context configured, then data entry management system 10 may present the working context attributes based on the active working context configuration. In an exemplary embodiment, data entry management system 10 may allow the configurable context sensitive data to be available for all drop-down list boxes and entry fields whether they are displayed in searches or overview pages.

In an exemplary embodiment, data entry management system 10 includes parameters which define which route should be applied. In an exemplary embodiment, first route 100 may show data entry option in a drop-down with or without button 35. In another exemplary embodiment, route two 102 may show a search screen 36. Search screen 36 includes search field 37. In an exemplary embodiment, route three 104 may show a multi-dimensional selector 41. Multi-dimensional selector 41 includes a filter area 38 and a data selection area 40. In an exemplary embodiment, route four 106 may apply behavior (e.g., single-dimensional selector screen) to support migration, if a customer would like to stick to the drop-down list box or search. Data entry management system 10 may display a single-dimensional selector screen 108 based on a determination that route four 106 should be utilized. In an exemplary embodiment, multi-dimensional selector 41 may be a hierarchical selector.

In an exemplary embodiment, multi-dimensional selector 41 includes filter area 38 and data selection area 40. Filter area 38 may be optional and may be controlled by the configuration of data entry management system 10. Filter area 38 may be a default for data entry management system. Filter area 38 may be filled with default data. Filter area 38 may have no entry marked initially. Filter entries may be modified and/or enhanced by utilizing user filters. Filter entries may be enhanced, modified, and/or restricted based on the configuration of data entry management system 10. Filters may be role dependent and/or attribute dependent. Filter area 38 may control the data that is available for data selection. In an exemplary embodiment, the filter may provide context to the data. For example, instead of showing the complete customer hierarchy, the filter limits the display to only new customers, or customers that have a certain value or status. Therefore, the content is data driven, as the data in the navigator is retrieved based on what is stored in database 16 and what is defined as the filter. Filter area 38 may control the structure of the data within the data selection area (e.g., hierarchy, grouping, flat list, etc.). Data selection area 40 may contain hierarchy, two-level grouping, and/or a flat list. Utilizing data selection area 40, the user may select one or multiple elements. Data selection area 40 may have nodes that can be selected and nodes that cannot be selected. For example, chocolate cannot be select but chocolate) can be selected. Chocolate is the overall category and chocolate) is a product in that overall category.

In an exemplary embodiment, configurable context sensitive data may be utilized for any data entry across business suites.

In exemplary embodiments, the configurable context sensitive data may be configurable with the following features, such as, authorization concept (e.g. territory management), Access Control Engine ("ACE"), PFCG system to determine data entry options, BAdi to determine data entry options; pre-defined view to determine data entry options, maximum number of entries if there is more data, and button 35 may be used to select further allowed data. The ACE may control high-level authorization rights. PFCG system may control authorization roles that can be assigned to business roles. For example, a Key Account Manager may be a business role and this business role may have one or multiple authorization roles assigned to control which authorizations (e.g., create, edit, delete, etc.) users have that are assigned to the business role.

In an exemplary embodiment, data entry management system 10 may control whether the multiple selection option is allowed or not. In another exemplary embodiment, data entry management system 10 may control whether the last x entry-feature is used or not. In an exemplary embodiment, data entry management system 10 may be have an inheritance concept that is defined on a higher level (e.g. from domain to attribute to UI attribute) and defines how drop-down list boxes and data entry fields behave. This allows data entry management system 10 to overwrite the behavior on a lower level (e.g., UI attribute). In an exemplary embodiment, all configurations may be business role specific so that the same attribute (domain) may have different behaviors in different business roles.

Figure 3:
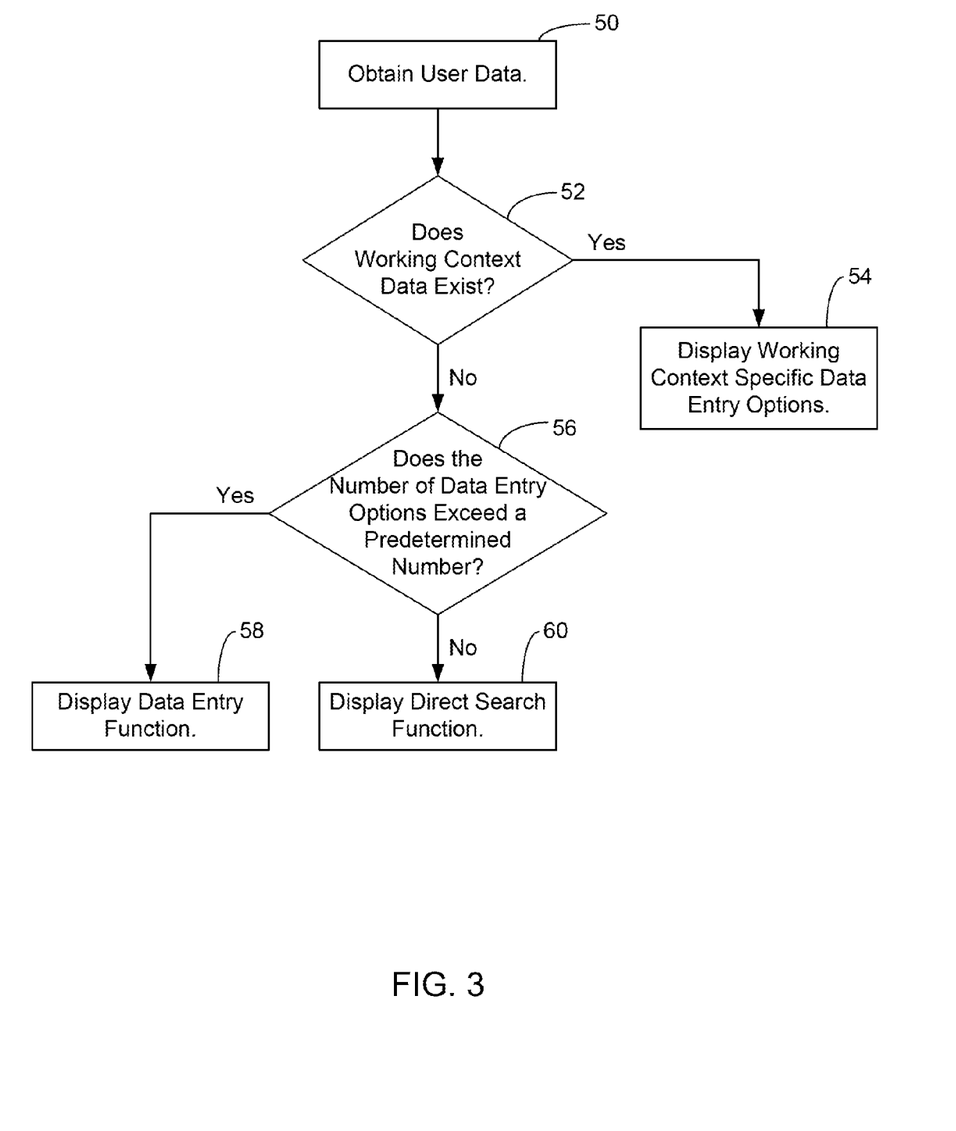
FIG. 3 is a flowchart for the context data entry system, according to one exemplary embodiment.

In FIG. 3, a flowchart for the context data entry system is shown, according to an exemplary embodiment. Data entry management system 10 obtains user data (step 50). Data entry management system 10 determines whether working context data is available (step 52). If working context data is available, then data entry management system 10 displays working context specific data entry options (step 54). If working context data is unavailable, then data entry management system determines whether the number of data entry options exceed a predetermined number (step 56). If the data entry options exceed a predetermined number, then data management entry system 10 displays a multi-dimensional selector (step 58). If the data entry options do no exceed a predetermined number, then data management entry system 10 displays a single-dimensional selector (step 60).

Figure 4:
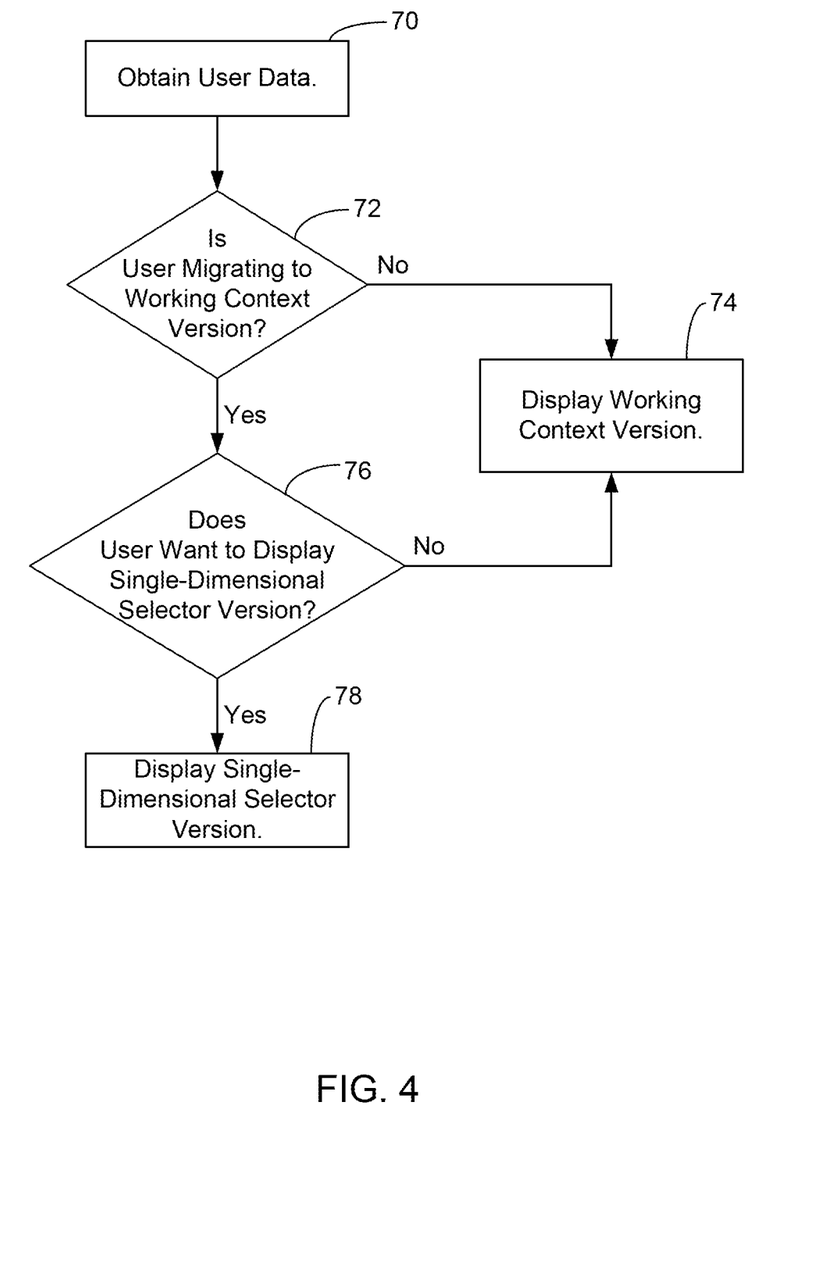
FIG. 4 is a flowchart for determining whether the system is being migrated from a non-context system to a context system, according to an exemplary embodiment.

In FIG. 4, a flowchart for determining whether the system is being migrated from a non-context system to a context system is shown, according to an exemplary embodiment. Data entry management system 10 obtains user data (step 70). Data entry management system 10 determines whether a user is migrating to a working context version (step 72). If the user is not migrating to a working context version, then data management system 10 displays a working context version (step 74). If the user is migrating to a working context version, then data management system determines whether the profile data indicates that the drop-down list version should be utilized (step 76). If the drop-down list version should not be utilized, then data management system 10 displays a working context version (step 74). If the profile indicates that a single-dimensional selector version should be utilized, then data management system 10 displays single-dimensional selector version (step 78).

In another exemplary embodiment, data entry management system 10 may perform a data entry management method which includes receiving data from at least one of working context module, business rules module, or authorization module. The method may also include determining a control route based on the received data and determining a characteristics of the received data. The method may include determining whether the control route or a profile has been modified. The method may include when the control route or the profile has been modified, modifying the transmitted control route based on the changes made to the control route or the profile.

In another exemplary embodiment, data entry management system 10 may include processing logic 14. Processing logic 14 may generate a control route. Processing logic 14 may generate a profile for at least one user. The control route may be based on at least one of a working context, a business rules data, and an authorization. The control route may be based on the working context. The control route may include help data. The help data may include instructions on data assignment arrangements. The control route may be based on authorization. The control route may be based on at least two of the working context, the business rules data, and the authorization. The control route may be based on the working context, the business rules data, and the authorization.

Figure 5:
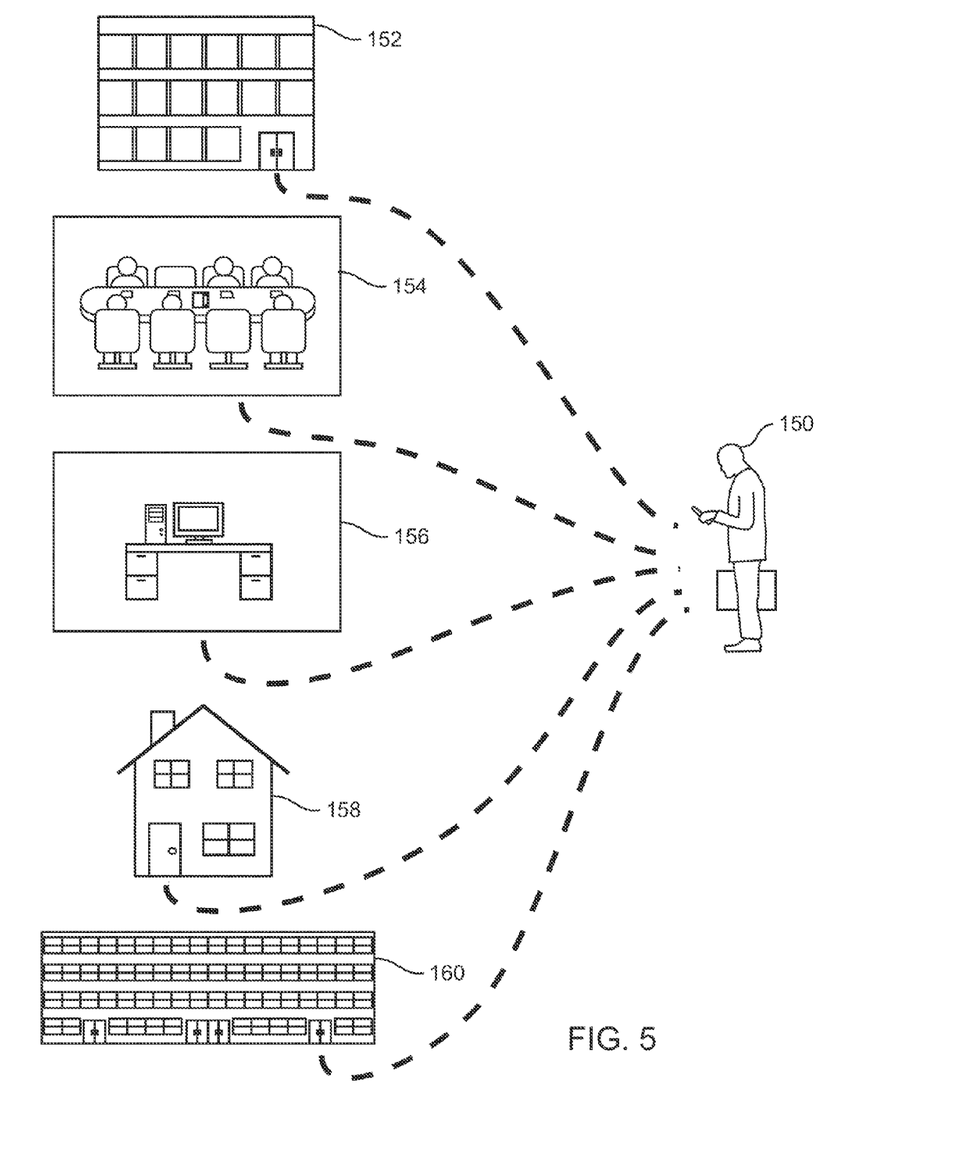
FIG. 5 is an illustration of various sales management locations, according to exemplary embodiments.

In FIG. 5, illustrations of various sales management locations are shown, according to exemplary embodiments. A salesperson 150 may travel to numerous locations during the sales cycle. In exemplary embodiments, salesperson 150 may travel to a client site 152, a conference room 154, a sales office 156, a home 158, a call center 160, a trade show, a warehouse, etc. In an exemplary embodiment, data entry management system 10 may apply a working context to a user profile based on a personal digital assistant functionality (e.g., calendar, task, global positioning signal, contacts list, etc.), and/or recent client searches.

Figure 6A:
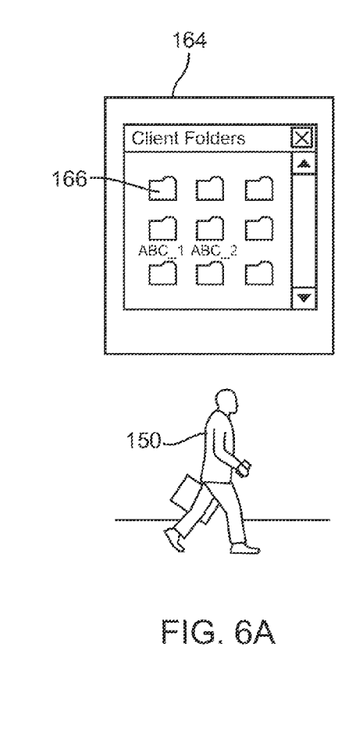
FIGS. 6A-6C are illustrations of the calendar functionality being utilized as a dynamic characteristic, according to an exemplary embodiment.
Figure 6B:
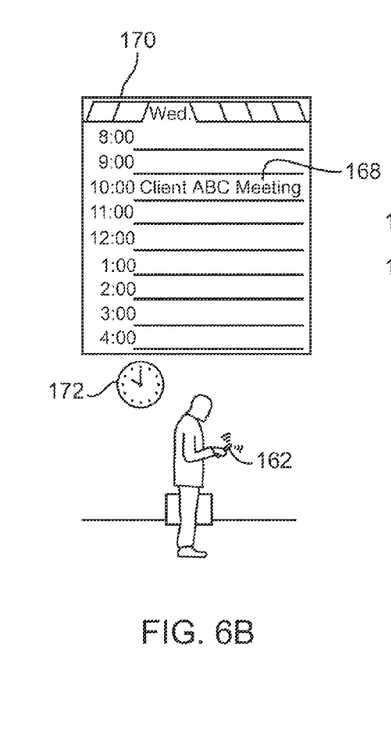
Figure 6C:
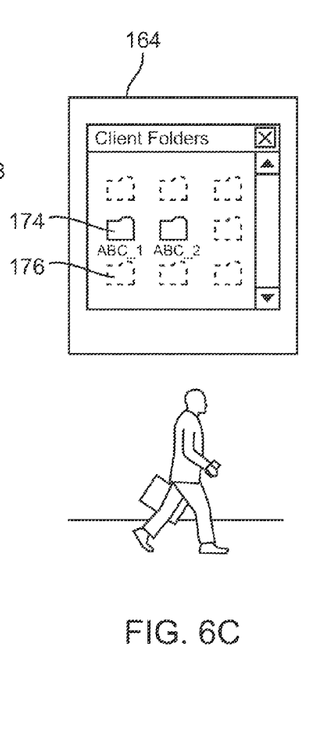

In FIGS. 6A-6C, an illustration of a personal digital assistant functionality (e.g., calendar) being utilized as a dynamic characteristic is shown, according to an exemplary embodiment. In FIG. 6A, salesperson 150 is traveling to a client meeting and has access to all of the salesperson's client folders 166 based on the salesperson's static working context or a profile which is shown in a window 164, according to an exemplary embodiment. For example, salesperson 150 may have five clients and would have access to specific data files related to these five clients.

In FIG. 6B, salesperson 150 may have a personal digital assistant 162. Salesperson 150 may have a calendar entry 168, which indicates that salesperson 150 has a ten o'clock appointment with Client ABC. In this exemplary embodiment, a clock 172 indicates that the time is ten o'clock. Based on the dynamic working context (which may be imported into a profile) of salesperson 150 having calendar entry 168 which indicates that salesperson 150 is meeting with Client ABC, salesperson's working context has changed and now salesperson 150 may only be able to access Client ABC files 174 (see FIG. 6C). In an exemplary embodiment, Non-Client ABC files 176 may not be displayed to salesperson 150. In exemplary embodiments, Non-Client ABC files 176 may be accessed once the meeting with Client ABC is finished which may be based on the calendar functionality, an input from salesperson 150, or another determination that salesperson 150 has left Client ABC (e.g., geographic location). For example, salesperson's calendar may indicate that the meeting with Client ABC starts at ten o'clock and ends at eleven o'clock. Based on the meeting starting at ten o'clock and ending at eleven o'clock, the working context for salesperson 150 may be based on Client ABC from ten o'clock to eleven o'clock. In another example, salesperson's personal digital assistant 162 may have a task function which indicates that salesperson 150 will be working on Client ABC from ten o'clock to eleven o'clock. Based on the task starting at ten o'clock and ending at eleven o'clock, the working context for salesperson 150 may be Client ABC from ten o'clock to eleven o'clock.

In an exemplary embodiment, salesperson 150 may reapply salesperson static working context to the profile by resetting the dynamic working context. For example, salesperson 150 may be able to press a clear button on personal digital assistant 162 which removes the dynamic characteristic (e.g., calendar, task, etc.) which was the basis for the dynamic working context. In another embodiment, salesperson's physical location may be the dynamic characteristic which is utilized to determine the working context. For example, salesperson's calendar may indicate that the meeting with Client ABC start at ten o'clock and ends at eleven o'clock. However, based on positioning data obtained from a mobile device (e.g., cell phone, personal digital assistant 162, etc.) salesperson's 150 position is obtained. When salesperson's 150 position no longer corresponds to the location of Client ABC, the dynamic working context may be reset to allow salesperson 150 to obtain all of salesperson's files (e.g., Client ABC files 174 and Non-Client ABC files 176). In exemplary embodiments, the time data and position data may have buffer zones. For example, salesperson's calendar may indicate that the meeting with Client ABC starts at ten o'clock and ends at eleven o'clock. In this example, the system may wait until eleven fifteen before removing the dynamic working context from the profile. In another example, the system may remove the dynamic working context early (e.g., ten forty-five) based on salesperson's preferences. In another example, the system may waited until salesperson 150 is a certain distance away (e.g., one mile) before removing the dynamic working context.

In an exemplary embodiment, a Key Account Manager may be assigned to a client. The client may have numerous locations throughout the world. In an exemplary embodiment, the Key Account Manager may want to create a trade program for the client's Atlanta stores for the next fiscal year and for a specific product line (e.g., Star Ice creams). In this exemplary embodiment, the Star Ice creams may be a node in the product hierarchy. The process may start with an analysis of last years results. For example, the attributes for the working context may be set to client's Atlanta stores (for the customer field), Star Ice creams (for the product field), and last fiscal year (for the year field). The Key Account Manager may then request business intelligence reports. In an exemplary embodiment, the business intelligence reports may include volume, revenue, compliance, and effectiveness data related to the client's Atlanta stores, Star Ice creams, and the last fiscal year. The Key Account Manager may not need to set a filter for this data because the working context enables delivery of the correct reports for this analysis. The Key Account Manager obtains headquarter planning data for the next fiscal year. For example, forecast data related to the client's Atlanta stores, Star Ice creams, and the next fiscal year are received by the system. In an exemplary embodiment, the Key Account Manager navigates the business intelligence reports and forecasts yearly volumes and total revenue. Based on the working context, the Key Account Manager may only be shown relevant data relating to the client's Atlanta stores, the Star Ice creams product, and the next fiscal year. For example, the system may only show headquarter goals for the client's Atlanta stores with regard to the Star Ice creams product during the next fiscal year. In an exemplary embodiment, the Key Account Manager may be able to navigate to the trade funds management application and view the funds that have been made available for the client's Atlanta stores, the Star Ice creams product, and the next fiscal year. In an exemplary embodiment, the Key Account Manager may not be able to view the funds that have been made available for the client's Atlanta stores, the Star Chocolate product, and the next fiscal year. In addition, the Key Account Manager may not be able to view the funds that have been made available for the client's Philadelphia stores, the Star Ice creams product, and the next fiscal year. In another exemplary embodiment, the Key Account Manager may not be able to view the funds that have been made available for another client's Atlanta stores, the Star Ice creams product, and the next fiscal year. It should be noted that changing any criteria may remove the data from the customized database (e.g., secondary database 15) available to the Key Account Manager.

In an exemplary embodiment, the Key Account Manager may create a trade promotion. The trade promotion is pre-populated with customer data (e.g., client's Atlanta stores). The Key Account Manager may enter the time period (e.g., July 1 to July 14). In an exemplary embodiment, the Key Account Manager may select Star Ice creams one gallon, Star Ice creams five gallons, etc. In an exemplary embodiment, the search help and/or pull down field(s) only displays nodes (e.g., products) under the main Star Ice creams node based on the working context. In this exemplary embodiment, the Star Chocolate products are not displayed because the Star Chocolate products are under the main Star Chocolate node which is different than the Star Ice creams node because they are in a different branches of the hierarchy. It should be noted that customer hierarchy may work in a similar way to the product hierarchy.

In an exemplary embodiment, the Key Account Manager may spend some time (e.g., 5 hours, 1 day, 2 days, 3 days, etc.) creating the plan for the Star Ice creams. In an exemplary embodiment, the Key Account Manager may navigate the calendar functionality and run an open context query. During this query, the Key Account Manager may discover that one of the promotions is missing because it was inadvertently passed over. The Key Account Manager may open up a list of templates (e.g., shell short list) that are appropriate templates based on the working context and drag a template to the calendar to create the missing promotion.

In an exemplary embodiment, the Key Account Manager may check the volumes and/or cost data. The business intelligence reports are generated and verified. It should be noted that any function disclosed herein as being performed by the any user may be automated.

In an exemplary embodiment, the Key Account Manager may search for all the trade promotions utilizing a created status which may filter out all of the trade promotions that the Key Account Manager or others users have rejected. Based on the dynamic working context which was imported into the profile, only trade promotions for the client's Atlanta stores with a Star Ice creams product for the next fiscal year are received/displayed. In this exemplary embodiment, the Key Account Manager may selected a few, a plurality, or all of the trade promotions to be submitted. The trade promotions are submitted to an approval user (e.g., Sales Director) for their approval. The approval user may receive an email notifying the approval user that trade promotions are ready to be approved. In an exemplary embodiment, the approval user enters the working context (e.g., client's Atlanta stores, Star Ice cream products, and next fiscal year) to obtain the trade promotions which are ready for approval. In another exemplary embodiment, the approval user links to the trade promotions via a link attached to the email notification. In another exemplary embodiment, the working context is applied to the approval user based on a dynamic element. For example, the approval user's calendar may have an entry which states that on Monday at 10 am the task of reviewing/approving Key Account Manager's trade promotions is scheduled. The system may automatically enter the appropriate working context based on this dynamic element into the profile. The approval user's calendar may have another entry which states that on Monday at 11 am the task of reviewing/approving another Key Account Manager's trade promotions is scheduled. At a specific time (before, at, or after 11 am), the system may automatically enter the appropriate working context based on this dynamic element. In an exemplary embodiment, the system may not change the working context based on the 11 am calendar entry when the approval user has not finished reviewing/approving the trade promotions scheduled to be reviewed at 10 am. In another exemplary embodiment, the system may include a rolling working context which allows the user to obtain data from a point in time to some other point in time (e.g., today plus fifteen days). For example, working context for the approval user may be for the entire morning. Therefore, the working context based on the 10 am entry and the 11 am entry would be available to the approval user. In an exemplary embodiments, the time period may be any time period (e.g., one hour, four hours, one day, three days, one week, two weeks, one month, etc.).

In another exemplary embodiment, the dynamic element may be the time the trade promotions were submitted for approval. For example, Key Account Manager1 submits trade promotions at 10 am and Key Account Manager2 submits trade promotions at 10:30 am. Because Key Account Manager1 entered their trade promotions before Key Account Manager2, the system may enter the appropriate working context for the approval user based on Key Account Manager1's submission. In another exemplary embodiment, the system may enter the appropriate working context for the approval user based on Key Account Manager2's submission being later than Key Account Manager1's submission.

In an exemplary embodiment, a Service Representative may be assigned to five stores that have ten different products (e.g., two products for each store with no overlap). On a service call, Service Representative's working context may be dynamically set to show only the two products for a particular store. In an exemplary embodiment, only the data (e.g., maintenance codes, etc.) associated with the two products may be displayed for the Service Representative. The setting of the working context works as previously disclosed.

In another exemplary embodiment, a Marketing Manager may be assigned to the entire ice cream product category. The working context for the Marketing Manager may be dynamically set as was previously disclosed.

In an exemplary embodiment, a Key Account Manager may be responsible for the execution of given marketing initiatives for accounts. In addition, Key Account Manager may be responsible for developing and monitoring sales and promotion plans. In an exemplary embodiment, a Brand Manager may be responsible for the management of a specific brand to meet targets/objectives. In an exemplary embodiment, a Finance Manager may provide budgets and financial measures for the execution of trade promotions and track overall spending to avoid financial gaps and manage budget re-allocations. In an exemplary embodiment, a Trade Marketing Manager may be responsible for marketing strategies directed at customer channels, wholesalers, distributors, retailers. In an exemplary embodiment, an Area (territory) Manager may be managing and monitoring day to day sales and service operations of their assigned territories to achieve their sales, delivery and merchandising goals. In an exemplary embodiment, a Sales Director and/or Vice President of Sales may be responsible to develop and apply the sales strategy and objectives. Sales Director and/or Vice President of Sales may be responsible for monitoring of sales plans and sales pipeline and determining reasons for attainment/under achievement of responsible accounts. In an exemplary embodiment, a Marketing Director and Vice President of Marketing may be responsible for overall corporate positioning as well as trade and brand marketing initiatives. In an exemplary embodiment, a Trade Promotion Management professional may be an internal user who is working with the complete Trade Promotion Management solution. In an exemplary embodiment, a Trade Finance professional may be an internal user who is working with the financial side of the Trade Promotion Management solution. In an exemplary embodiment, a Trade Claims professional may be an internal user who is working with the claims management part of the Trade Promotion Management solution. The working context may be enabled in the non-strict mode for any of the above referenced user role.

Figure 7A:
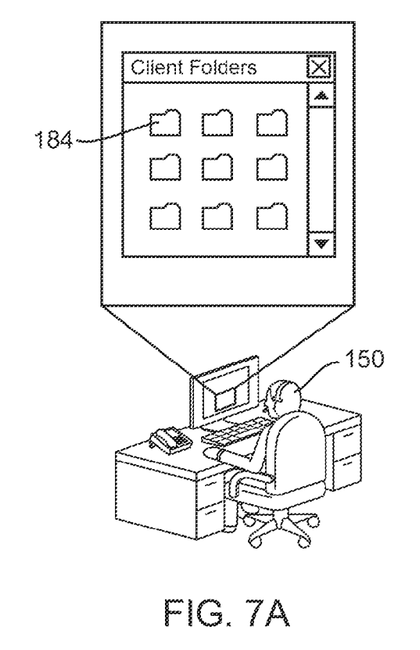
FIGS. 7A-7C are illustrations of incoming data being utilized as a dynamic characteristic, according to an exemplary embodiment.
Figure 7B:
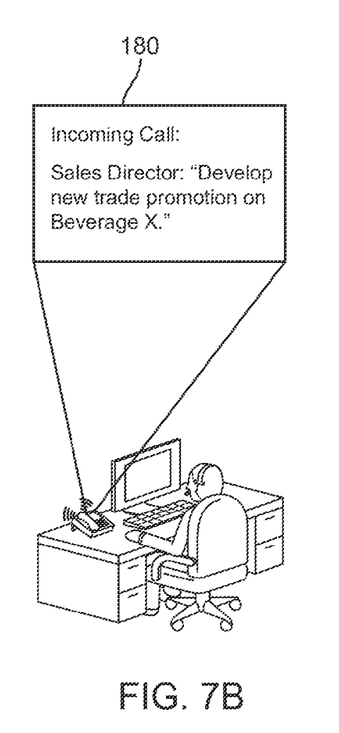
Figure 7C:
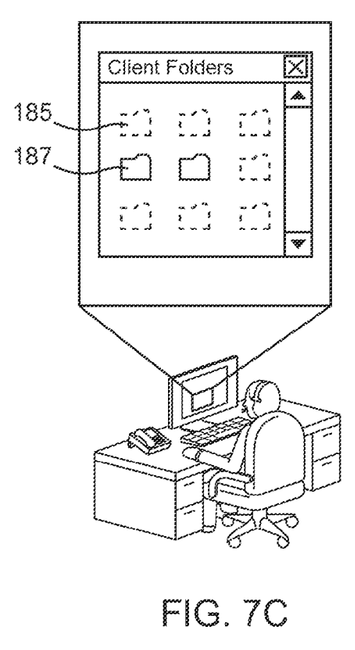

In FIGS. 7A-7C, illustrations of incoming data being utilized as a dynamic characteristic are shown, according to an exemplary embodiment. In an exemplary embodiment, salesperson 150 may have access to all beverage files 184. In exemplary embodiments, sales person 150 may have access to only product specific files, customer specific files, customer support specific files, or any combination thereof. In FIG. 7B, call salesperson 150 receives incoming data 180 which indicates that Sales Director want a new trade promotion developed for Beverage X. In exemplary embodiments, incoming data 180 may indicate the source of the data by the incoming phone number, the phone called, or any other source identification method. Based on salesperson 150 having access to all beverages file 184, salesperson 150 may be able to access Beverage X files 187 and may not be able to access Non-Beverage files 185 (see FIG. 7C). In an exemplary embodiment, based on incoming data 180, the dynamic working context may be modified to Beverage X.

Figure 8:
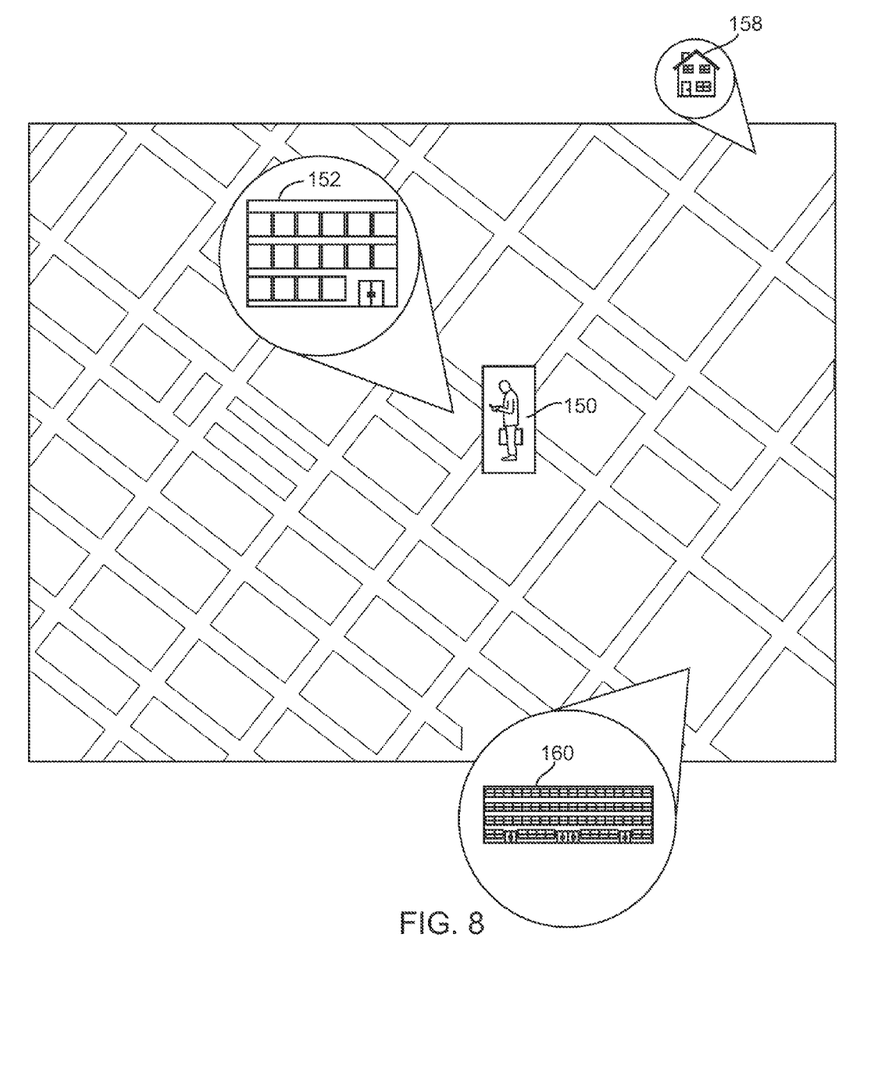
FIG. 8 shows illustrations of sales locations being utilized as dynamic characteristics, according to exemplary embodiments.

In FIG. 8, illustrations of sales locations being utilized to determine dynamic characteristics are shown, according to exemplary embodiments. In an exemplary embodiment, salesperson 150 may have three different work environments planned for today. For example, salesperson 150 may visit Client ABC at client site 152 to discuss a new trade promotion, attend a meeting with potential Client XYZ at call center 160 to evaluate call center capabilities, and work on a marketing plan for Client DEF at home 158. Based on geographic proximity (e.g., location of salesperson 150 to the location of client site 152, call center 160, and/or home 158) of salesperson 150 and targeted site, the data entry management system 10 dynamically changes the working context in the profile. In an exemplary embodiment, salesperson 150 is closer to client site 152 then to home 158 or call center 160. Therefore, data entry management system 10 modifies the working context in the profile to be based on Client ABC. When salesperson 150 moves closer to home 158 the system may modify the working context in the profile to be based on Client DEF. In addition, when salesperson 150 moves closer to call center 160 data entry management system 10 changes the working context in the profile to be based on potential Client XYZ. In another exemplary embodiment, the dynamic working context may be based on more than one factor. For example, the calendar functionality, the task functionality, location data, and/or any other dynamic data may be combined (See FIG. 3B). Client ABC may be located right next to Client DEF. Salesperson 150 may be driving by Client ABC's site to attend a meeting with Client DEF. In an exemplary embodiment, data entry management system 10 may prioritize dynamic characteristics. For example, calendar functionality may have first priority, task functionality may have second priority, and location data may have third priority. In this exemplary embodiment, the appointment scheduled with Client DEF takes priority over salesperson 150 being located in close proximity to Client ABC. Therefore, the working context may not change to Client ABC based on the location data. It should be noted that any priority schedule may be utilized.

In an exemplary embodiment, data entry management system 10 may include computer executable instructions tangibly embodied on non-transitory media. Data entry management system 10 may include processing logic 14 which may control a display area. Processing logic 14 may determine a display area content. The display area content may include one of a working context search screen, a search screen, a single-dimensional selector screen, and a multi-dimensional selector screen. Processing logic 14 may determine which of the working context search screen, the search screen, the single-dimensional selector screen, and the multi-dimensional selector screen to display in the display area based on a profile. In another exemplary embodiment, the working context search screen may be displayed based on the profile including business contact data. In an exemplary embodiment, the search screen may be displayed based on the profile not including business contact data. In an exemplary embodiment, the multi-dimensional selector screen may be displayed based on the profile not including business data and a number of entries exceeding a predetermined number. In an exemplary embodiment, the multi-dimensional selector screen may be displayed based on the profile including migration data, the migration data may indicate that a user profile has selected a multi-dimensional selector screen configuration. In an exemplary embodiment, the working context search screen may be displayed based on the profile including business data and the working context search screen includes working context data fields and a button. In an exemplary embodiment, the button may allow for a selection of additional allowed data.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Machine-readable media may be non-transitory. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A data entry management system including computer executable instructions tangibly embodied on non-transitory media, the data entry management system comprising:
   a processing logic configured to control a display area, the processing logic configured to determine by one or more processors a display area content, the display area content including a data entry function screen with a context sensitive data entry control field,
   wherein the context sensitive data entry control field upon user-activation leads to a display of one of a working context search screen, wherein the working context search screen is displayed based on the business contact data, a search screen, wherein the search screen is displayed based on the profile not including business contact data, a single-dimensional selector screen, wherein the single-dimensional selector screen is displayed based on the profile including migration data, a multi-dimensional selector screen in the display area, wherein the multi-dimensional selector screen is displayed based on the profile not including business data and a number of entries exceeding a predetermined number, and wherein the processing logic determines which of the working context search screen, the search screen, the single-dimensional selector screen, and the multi-dimensional selector screen to display in the display area based on a profile.

2. The data entry management system of claim 1, wherein the profile includes business contact data, and wherein the working context search screen is displayed based on the business contact data.

3. The data entry management system of claim 1, wherein the processing logic determines whether the profile includes business contact data and wherein the processing logic determines which of the working context search screen, the search screen, the multi-dimensional selector screen, and the single-dimensional selector screen to display in the display area based on a business contact data availability determination.

4. The data entry management system of claim 3, wherein the search screen is displayed based on the profile not including business contact data.

5. The data entry management system of claim 1, wherein the multi-dimensional selector screen is displayed based on the profile not including business data and a number of entries exceeding a predetermined number.

6. The data entry management system of claim 1, wherein the single-dimensional selector screen is displayed based on the profile including migration data, the migration data indicating that the single-dimensional selector screen will be utilized during a system migration.

7. The data entry management system of claim 1, wherein the working context search screen is displayed based on the profile including business data and the working context search screen includes working context data fields and a button.

8. A program data entry management system comprising computer executable instructions tangibly embodied on nontransitory media for implementing by one or more processors a data entry management automated method, the method comprising:
receiving data from at least one of a control route module, a profile management module, a working context module, a business rules module, and an authorization module;
determining a profile based on the received data;
determining a content of a display area based on the profile; and
displaying the content in the display area;
wherein the content includes a data entry function screen with a context sensitive data entry control field,
wherein the context sensitive data entry control field upon user-activation leads to a display of one of a working context search screen, wherein the working context search screen is displayed based on the business contact data, a search screen, wherein the search screen is displayed based on the profile not including business contact data, a single-dimensional selector screen, wherein the single-dimensional selector screen is displayed based on the profile including migration data, a multi-dimensional selector screen in the display area, wherein the multi-dimensional selector screen is displayed based on the profile not including business data and a number of entries exceeding a predetermined number, and
wherein a processing logic determines which of the working context search screen, the search screen, the single-dimensional selector screen, and the multi-dimensional selector screen to display in the display area based on a profile.

9. The method of claim 8, wherein the determining the content in the display step includes determining that the profile includes business contact data and wherein the displaying the content in the display area step includes displaying the working context search screen based on the profile including business contact data.

10. The method of claim 8, wherein the determining the content in the display step includes determining that the profile does not include business contact data and wherein the displaying the content in the display area step includes displaying the search screen based on the profile not including business contact data.

11. The method of claim 8, wherein the determining the content in the display step includes determining that the profile does not including business data and that a number of entries exceeding a predetermined number and wherein the displaying the content in the display area step includes displaying the multi-dimensional selector screen based on the profile not including business contact data and the number of entries exceeding the predetermined number.

12. The method of claim 8, wherein the determining the content in the display step includes determining that the profile includes migration data which indicates that the single-dimensional selector screen will be utilized during a system migration and wherein the displaying the content in the display area step includes displaying the single-dimensional selector screen based on the profile including migration data which indicates that the single-dimensional selector screen will be utilized during the system migration.

13. The method of claim 8, wherein the profile is an application profile.

14. A data entry management system comprising:
a processing logic configured to control a display area, the processing logic configured to determine by one or more processors a display area content, the display area content including a data entry function screen with a context sensitive data entry control field;
a database coupled to the processing logic;
a memory coupled to the processing logic;
a control route engine coupled to the processing logic;
a profile management engine coupled to the processing logic;
a working context engine coupled to the processing logic;
a business rules engine coupled to the processing logic;
an authorization engine coupled to the processing logic; and
a function engine coupled to the processing logic;
wherein the context sensitive data entry control field upon user-activation leads to a display of one of a working context search screen, wherein the working context search screen is displayed based on the business contact data, a search screen, wherein the search screen is displayed based on the profile not including business contact data, a single-dimensional selector screen, wherein the single-dimensional selector screen is displayed based on the profile including migration data, a multi-dimensional selector screen in the display area, wherein the multi-dimensional selector screen is displayed based on the profile not including business data and a number of entries exceeding a predetermined number,
wherein the processing logic determines a configuration of the display area based on a profile, and wherein the processing logic determines which of the working context search screen, the search screen, the single-dimensional selector screen, and the multi-dimensional selector screen to display in the display area based on the profile.

15. The data entry management system of claim 14, wherein the working context search screen is displayed based on the profile.

16. The data entry management system of claim 14, wherein the search screen is displayed based on the profile.

17. The data entry management system of claim 14, wherein the multi-dimensional selector screen is displayed based on the profile.

18. The data entry management system of claim 14, wherein the single-dimensional selector screen is displayed based on the profile.

19. The data entry management system of claim 14, wherein the working context search screen is displayed based on the profile including business data and the working context search screen includes working context data fields and a button.

20. The data entry management system of claim 19, wherein the button allows for a selection of additional allowed data.

* * * * *